United States Patent [19]
Nakamura

[11] Patent Number: 5,885,363
[45] Date of Patent: Mar. 23, 1999

[54] METHOD OF CLEANING A GLASS SUBSTRATE

[75] Inventor: Toshihiko Nakamura, Hyogo-ken, Japan

[73] Assignee: Kabushiki Kaisha Toshiba, Kawasaki, Japan

[21] Appl. No.: 907,909

[22] Filed: Aug. 11, 1997

[30] Foreign Application Priority Data

Aug. 12, 1996 [JP] Japan .................................. 8-212499

[51] Int. Cl.⁶ .................................................. B08B 7/00
[52] U.S. Cl. .................................. 134/6; 134/7; 15/102; 15/103; 15/250.22
[58] Field of Search ............................ 134/6, 7; 15/102, 15/103, 250.22

[56] References Cited

U.S. PATENT DOCUMENTS 5,020,180  6/1991  Mimura ..................................... 15/103
5,551,986  9/1996  Jain ............................................ 134/6

FOREIGN PATENT DOCUMENTS 92-093816  3/1992  Japan .
7-218882   8/1995  Japan .

*Primary Examiner*—Zeinab El-Arini
*Attorney, Agent, or Firm*—Pillsbury Madison & Sutro LLP

[57] ABSTRACT

A squeegee unit is driven to rotate about a rotation axis perpendicular to a glass substrate surface with a motor while a plurality of blades of the squeegee unit contact on the substrate surface. The rotating squeegee unit is moved in a predetermined path on the substrate surface by relatively moving an X-Y stage so that its blades remove foreign materials adhered to the glass substrate surface.

8 Claims, 5 Drawing Sheets

METHOD OF CLEANING A GLASS SUBSTRATE

BACKGROUND OF THE INVENTION

1. Technical Field

This invention relates generally to a method of cleaning a glass substrate and an apparatus for the same in which various foreign materials, e.g., glass cullets adhered to the surface of the glass substrate are effectively removed.

2. Related Art

Many thin layers of electrodes, insulators and the like are formed on a glass substrate, e.g., the one used for a liquid crystal display panel. The surface of such a glass substrate should, thus, have no foreign materials and be sufficiently clean.

Further, such a liquid crystal display panel includes a pair of sheet-like glass substrates between which a liquid crystal layer is held and in its production process a mother glass substrate is cut out to make the sheet-like glass substrates a desired size. Since this results in leaving foreign materials including mainly glass cullets on the outer surfaces of the sheet-like glass substrates, it causes inconvenience when optical films, e.g., polarizers are put thereon.

Generally, a cleaning apparatus cleans up mother glass substrate surfaces and/or liquid crystal display panel surfaces so that foreign materials adhered thereto are removed in advance. The cleaning apparatus has relatively slender strip-like squeegees. The squeegees are driven along a predetermined direction on the glass surface with the blades thereof contacting on the glass surface so that various foreign materials thereon, such as glass cullets, are physically eliminated. As disclosed in Japanese Patent Publication (Tokkaihei) 4-93816 or the like, the squeegees are driven once or repeatedly from a same direction along the scanning path on the glass surface in a conventional cleaning process.

According to such a conventional cleaning method, the blades always contact on foreign materials from the same direction so that the foreign materials on the glass surface receive removing force from one direction only. Further, the blades contact on the foreign materials only once in the cleaning cycle. As a result, the foreign materials cannot always be eliminated from the glass surface in the case of some types of a foreign materials or adhesive conditions thereof so that sufficient cleanness of the glass surface is not necessarily achieved in the conventional method or apparatus. Driving the squeegees in the prior art cleaning method may be more often repeated. The processing time in such cases, however, becomes much longer and the cleaning efficiency is not always satisfactory.

SUMMARY OF THE INVENTION

The present invention overcomes such difficulties of the conventional cleaning method and/or apparatus. One object of this invention is to provide a method of cleaning a glass substrate capable of easily and reliably removing foreign materials therefrom. Another object of this invention is to provide a cleaning apparatus for carrying out the cleaning method.

In order to achieve the objects mentioned above, a method of cleaning a glass substrate according to one aspect of the present invention includes rotating the squeegees about an axis extending toward a direction perpendicular to the glass substrate surface on which blades of the squeegees contact and driving the same along a predetermined scanning path to remove foreign materials from the glass substrate.

A method of cleaning a glass substrate according to another aspect of the present invention includes providing a plurality of squeegees radially extending from a rotating axis thereof where the squeegees move on the surface of the glass substrate while rotating.

A method of cleaning a glass substrate according to another aspect of the present invention includes making a squeegee blade contact constantly on the foreign materials from different directions so that the foreign materials can be effectively removed from the glass surface.

An apparatus for cleaning a glass substrate according to one aspect of the invention includes a supporting device for a glass substrate, squeegees with blades contacting on the surface of the glass substrate, a rotating device to rotate the squeegees about its axis extending toward a direction perpendicular to the surface of the glass substrate, and a scanning device to drive the squeegees along a predetermined scanning path while the rotating blades contact on the surface of the glass substrate.

Further, an apparatus for cleaning a glass substrate according to another aspect of the present invention has a supporting device provided to support the glass substrate; a squeegee unit with its driving axis and a plurality of blades in which the driving axis extends along a direction perpendicular to the surface of the glass substrate and in which the blades provided radially from the driving axis are capable of contacting on the surface of the glass substrate; a rotating device which rotates the squeegee unit; and scanning device which drives the squeegee unit along a predetermined scanning path while the blades contact on the surface of the glass substrate.

The method of cleaning a glass substrate and the apparatus for cleaning the same of this invention physically remove various foreign materials from the surface of the glass substrate by driving the rotating squeegee unit over the entire surface of the glass substrate. Further, the blades of the rotating squeegee unit contact on the foreign materials many times a rotation and provide a plurality of forcing vectors thereto from various directions. As a consequence, it takes relatively short time to remove the foreign materials reliably from the surface of the glass substrate.

The above-stated and other objects and technical features of the present invention will become apparent from the following description when taken with the accompanying drawings. It will be understood, however, that the drawings are for purposes of illustration and are not to be construed as defining the scope of the invention, reference being had for the latter purpose to the claims appended hereto.

DESCRIPTION OF THE PREFERRED EMBODIMENT

Figure 1:
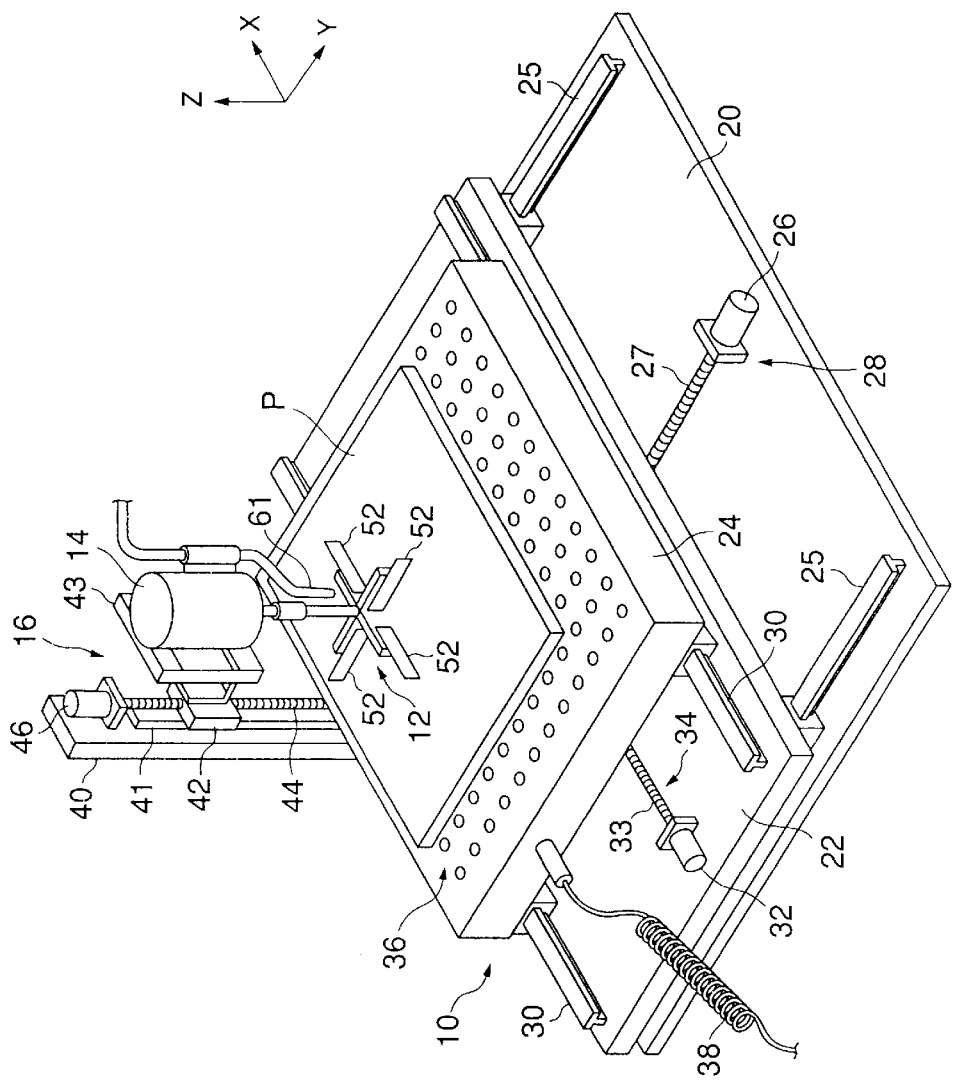
FIG. 1 is a perspective view of an apparatus for cleaning a glass substrate in accordance with one embodiment of the present invention.

Referring to the drawings, there will be explained an apparatus for cleaning a glass substrate of one embodiment of the present invention. A glass substrate or sheet with respect to the present invention is made of ordinary glass materials as well as quartz. Product No. 7059 manufactured by Corning Glass Company is used for such a glass substrate as described hereinbelow in the embodiment. As shown in FIG. 1, the apparatus has an X-Y stage 10 functioning as a supporting and scanning device for supporting and moving a glass substrate P, a squeegee unit 12 rotatably provided in the apparatus, a motor 14 to rotate the squeegee unit 12 as a driving device, and an elevation mechanism 16 to move the squeegee unit 12 and the motor 14 up and down relatively to the glass substrate P supported on the X-Y stage 10.

The X-Y stage 10 includes a plate-like base 20, a Y-stage 22, and an X-stage 24. A pair of guide rails 25 extending toward the Y-axis direction is fixed on the base 20 on which the Y-stage 22 is supported movably along the guide rails 25. On the base 20 a Y-axis driving unit 28 which includes a step motor 26 and a lead screw 27 is provided to drive the Y-stage 22 along the Y-axis reciprocally.

A pair of guide rails 30 extending toward the X-axis are provided on the Y-stage 22. An X-stage 24 is supported movably along the guide rails 30 on the Y-stage. The X-stage 24 is driven reciprocally along the X-axis by an X-axis driving unit 34 which includes a step motor 32 and a lead screw 33.

The X-stage 24 has many suction holes 36, the apertures of which are provided on the surface of the X-stage 24. The suction holes are connected to a vacuum pump (not shown) through a vacuum line 38. The glass substrate P is sucked to the X-stage 24 in the event that the glass substrate P is set on the X-stage 24 and that the vacuum pump is in operation.

The motor 14 is provided above the X-stage 24 to rotate the squeegee unit 12. The rotation axis of the motor 14 extends along the Z-axis perpendicular to the surface of the glass substrate P. The motor 14 is supported at the elevation mechanism 16 which drives the motor 14 up and down along the Z-axis.

The elevation mechanism 16 has a supporting post 40 standing along the Z-axis. The post 40 has a guide rail 41 extending along the Z-axis and a movable block 42 is supported movably along the guide rail 41. The motor 14 is set on the movable block 42 through a bracket 43.

A step motor 46 is fixed to the supporting post 40 to drive a lead screw 44 which in turn is in gear with the movable block 42. When the step motor 46 is driven, the movable block 42 and the motor 14 move up and down.

Figure 2:
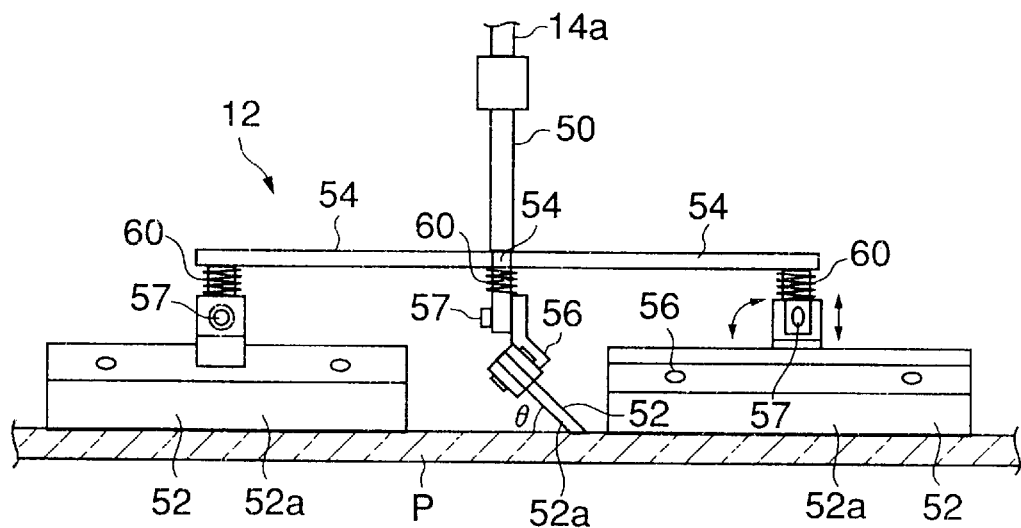
FIG. 2 is a side view of a squeegee unit of the apparatus shown in FIG. 1.
Figure 3:
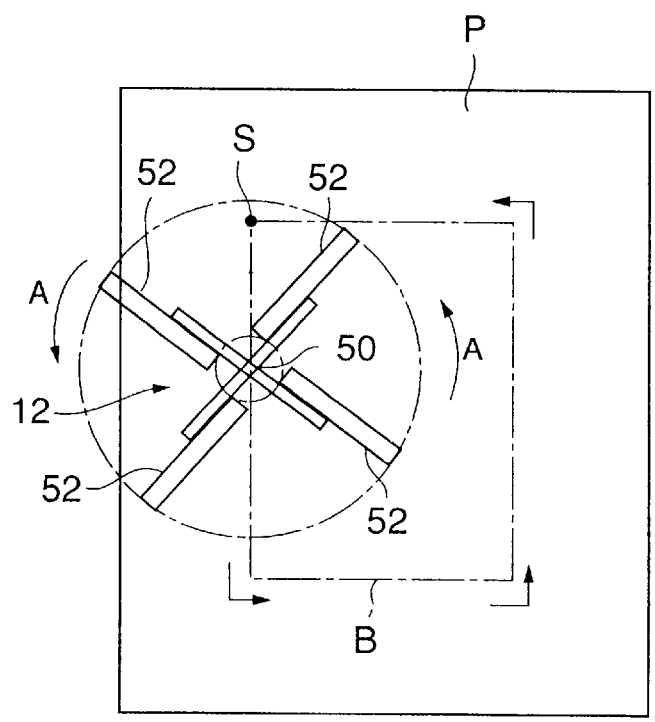
FIG. 3 is a plan view of the squeegee unit and the glass substrate.

As shown in FIGS. 1 through 3, the squeegee unit 12 has a driving axis 50 connected to a rotation axis 14a of the motor 14 and extending along the Z-axis, and a plurality of squeegees, e.g., four squeegees as shown, which are capable of contacting on the surface of the glass substrate P set on the X-stage.

In detail, the squeegee unit 12 has four supporting arms 54 extending radially from the lower part of the driving axis 50 and holders 56 are connected to the end of the supporting arms 54. Each holder 56 is set to be movable along the Z-axis and rotates about a pivot 57 extending in parallel with the surface of the X-stage 24. The holder 56 is pushed downward, i.e., toward the X-stage 24 by a compression spring 60 provided between the holder 56 and the supporting arm 54.

Each squeegee 52 is narrow and rectangular in shape and is made of such a material as stainless steel, ceramics or the like which is lower in hardness than the glass substrate P. A blade 52a is fixed to the lower end of the squeegee 52 which is connected to the holder 56 in a detachable fashion.

The squeegee 52 and the blade 52a as well are made of stainless steel, e.g., product No. L-50 manufactured by NT Cutter, Inc. Ceramics is so hard and durable that a squeegee and its blade made thereof eliminate foreign materials from a glass substrate, easily and effectively. From view points of manufacturing cost and processing flexibility of materials, however, stainless steel is practically more suitable materials for a squeegee and its blade. It is further noted that a squeegee and its blade may be separately made of different materials.

Each squeegee 52 extending radially from the driving axis 50 is equally spaced from each other along its circumferential direction. The blade 52a connected to the lower end of the squeegee 52 is supported in the holder 56 with an appropriate angle $\theta$ of inclination so that the blade 52a may contact on the surface of the glass substrate P with a slant toward its rotation direction.

As shown in FIG. 2, an angle $\theta$ is defined between the surface of the glass substrate P and the squeegee 52. The angle $\theta$ ranges from 20 degrees through 50 degrees and is, preferably, set to be acute from 20 degrees through 45 degrees. Where the angle $\theta$ is larger than 50 degrees, the blade 52a does not move smoothly on the glass substrate P. Where, however, it is smaller than 20 degrees, mechanical design thereof becomes complicated. The angle $\theta$ is, therefore, set at 30 degrees in this particular embodiment.

The squeegee unit 12 and the motor 14 are driven up and down along the Z-axis with the elevation mechanism 16 while the squeegee unit 12 is also driven to rotate about the driving axis 50 with the motor 14. The squeegee 52 and the holder 56 are pressed toward the X-stage 24 by means of the spring 60 while the squeegee 52 rotates about the pivot axis 57.

In the vicinity of the upper portion of the squeegee unit 12 an injection nozzle 61 is provided to spout a grinding liquid toward the glass substrate P and the squeegee unit 12. The nozzle 61 is set on the motor 14 so that the nozzle 61 is movable up and down together with the motor 14.

Figure 4:
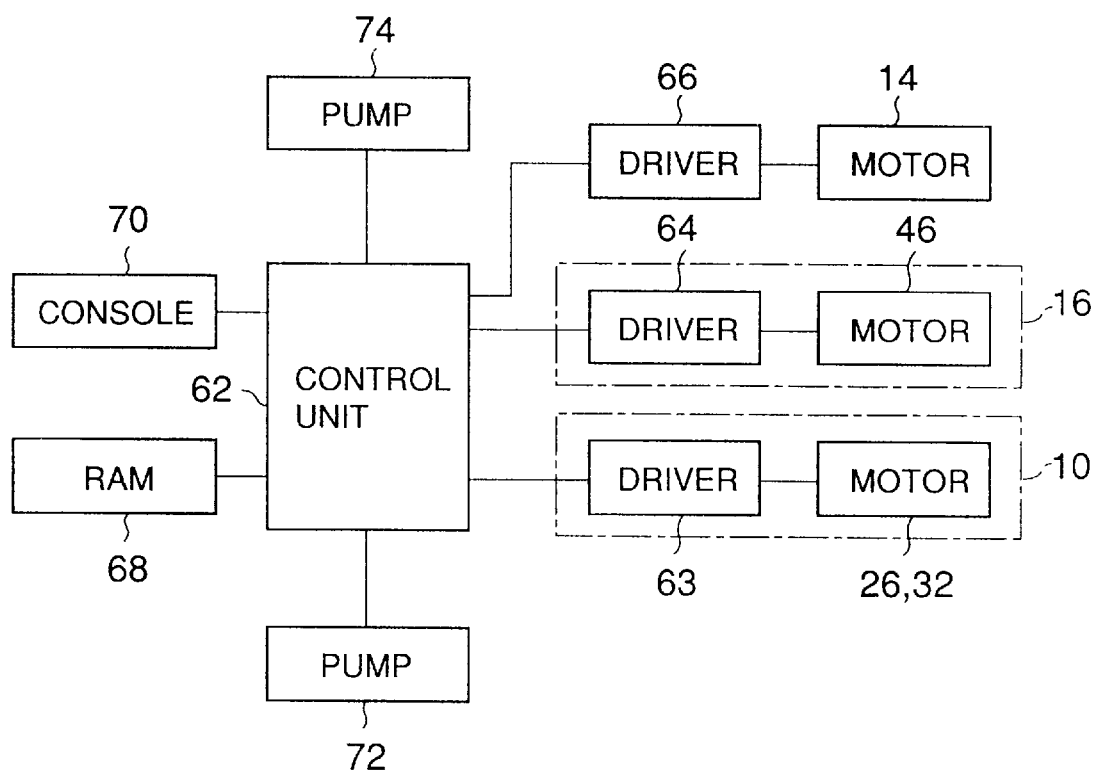
FIG. 4 is a block diagram of a control system of the apparatus.

As shown in FIG. 4, the cleaning apparatus further includes a control unit 62 which controls the entire operation thereof set forth above. The step motors 26 and 32 of the X-Y stage 10 and the step motor 46 of the elevation mechanism 16 are connected to the control unit 62 through drivers 63 and 64, respectively. The motor 14 to drive the squeegee unit 12 is also connected to the control unit 62 through a driver 66.

In addition, the control unit 62 has a RAM 68 storing control programs for the entire system and an operation panel 70 for an operator to input control data thereto. The vacuum pump 72 connected to the vacuum line 38 and functioning as a suction device, and injection pump 74 for supplying a grinding liquid to the nozzle 61 are also coupled to the control unit 62.

The method of cleaning a glass substrate P will be explained hereinbelow in accordance with the cleaning apparatus described above. As shown in FIG. 1, the glass substrate P to be cleaned is placed on the X-stage 24 of the X-Y stage 10. The side ends of the glass substrate P are set to be in parallel with the X-axis and Y-axis, respectively. The glass substrate is the one used for a liquid crystal display panel, for instance, which has foreign materials such as glass cullets, bonding solution, sealant or the like on the surface.

When the glass substrate P is set on the X-stage 24, the squeegee unit 12 and the motor 14 are moved to an upper position of the apparatus sufficiently far from the X-stage 24 in order to carry out the setting work of the glass substrate P smoothly. After the setting of the glass substrate P, the vacuum pump 72 is operated so that its suction force of the glass substrate P through the vacuum line 38 and the sucking holes 36 fixes it on the X-stage 24.

After completion of setting the glass substrate P, the X-Y stage 10 is driven to adjust the position of the glass substrate P with respect to the squeegee unit 12 in order for the driving axis 50 of the squeegee unit 12 to be placed over a starting point S of the glass substrate P as shown in FIG. 3.

In this situation the motor 14 rotates the squeegee unit 12 and the four squeegees 52 are driven to rotate about the rotation axis 50 in a direction A. Then, the squeegee unit 12 and the injection nozzle 61 are driven to come down by the elevation mechanism 16 and the motor 14 until the blades 52a of the squeegees 52 contact on the surface of the glass substrate P.

Each squeegee 52 is supported by the supporting arm 54 movably along the Z-axis direction perpendicular to the surface of the glass substrate P and rotates about the pivot axis 57 in parallel with the surface of the glass substrate. The blade 52a of the squeegee 52 constantly contacts on the surface of the glass substrate P while, at the same time, the spring 60 presses the blade 52a toward it.

In response to control programs stored in the RAM 68, the Y-axis and the X-axis driving units 28 and 34 of the X-Y stage 10 are driven to move the Y-stage 22 and the X-stage 24 so that the driving axis 50 of the squeegee 12 moves along a rectangular scanning path B on the surface of the glass substrate P. Further, the nozzle 61 spouts grinding water toward the squeegees 52 of the squeegee unit 12 and cools the same.

The four squeegees 52 of the squeegee unit 12 move along the scanning path on the glass substrate while rotating about the driving axis 50. Each blade 52a of the squeegees 52 is driven on the surface of the glass substrate P and removes foreign materials such as glass cullets, bonding solution, sealant or the like therefrom.

The scanning path B is provided in such a way that the squeegees 52 slides the entire surface of the glass substrate P and that the driving axis 50 and the central portion of the longitudinal direction of each squeegee 52 are always positioned on the surface of the glass substrate P. As a result, the four rotating squeegees 52 move on the surface of the glass substrate P and scratch foreign materials thereon many times from different directions. The foreign materials are, thus, removed from the glass substrate P, which, in turn, becomes clean on its entire surface.

When the rotation speed of squeegee unit 12 is too speedy, squeegee blades fluctuate in the cleaning of the substrate periphery and are likely to damage edges of the substrate P. The rotation of squeegee unit 12 ranges from 50 r.p.m. to 200 r.p.m. and, preferably, is set up from 80 r.p.m. to 120 r.p.m. In the embodiment mentioned above, the squeegee unit 12 is rotated at the rate of about 100 r.p.m. and the relative moving speed of the squeegee unit 12 with respect to the glass substrate P is about 25 mm/sec. In addition, it is desirable to dissolve more or less foreign materials adhered to the surface of the glass substrate P with organic solutions, e.g., alcohol in the case where they are bonding and sealant materials prior to cleaning by means of the cleaning apparatus.

The cleaning apparatus and method described above in detail as embodiments of this invention provide technical advantages in that the driving of the rotating squeegee can remove foreign materials approximately four through ten times more than the prior art apparatus and method and the contacting on the squeegee from different directions provides foreign materials with various removing vectors. The cleaning apparatus and method in accordance with such embodiments of the present invention can remove effectively foreign materials from the glass substrate and its removing efficiency improves to the extent of about 20 per cent compared with that of the prior art apparatus and method.

The embodiments of the present invention have realized method and apparatus for cleaning a glass substrate which have much shorter operation time and more satisfactory elimination of foreign materials from a glass substrate than the conventional method and apparatus.

In the above mentioned embodiment, its explanation has been made to clean up the surface of squeegee unit 12 but this invention is also applicable to apparatus for cleaning the surfaces of a pair of sheet-like glass substrates of a liquid crystal display panel between which a liquid crystal layer is held. After being placed on X-Y stage 10, a liquid crystal display device using Corning glass sheets of Product No. 7059 has been cleaned up on the main surfaces of 12.1" effective display area thereof. A pair of polarizers, then, have been put on the surfaces as optical films, respectively, so that a liquid crystal display panel has been produced. The liquid crystal display panel has not had any inconvenient foreign materials between the substrate and the optical film. As a consequence, the occurrence of insufficient display panels has been substantially decreased and its cleaning process time has been much shorter than conventional cleaning apparatus.

Figure 5:
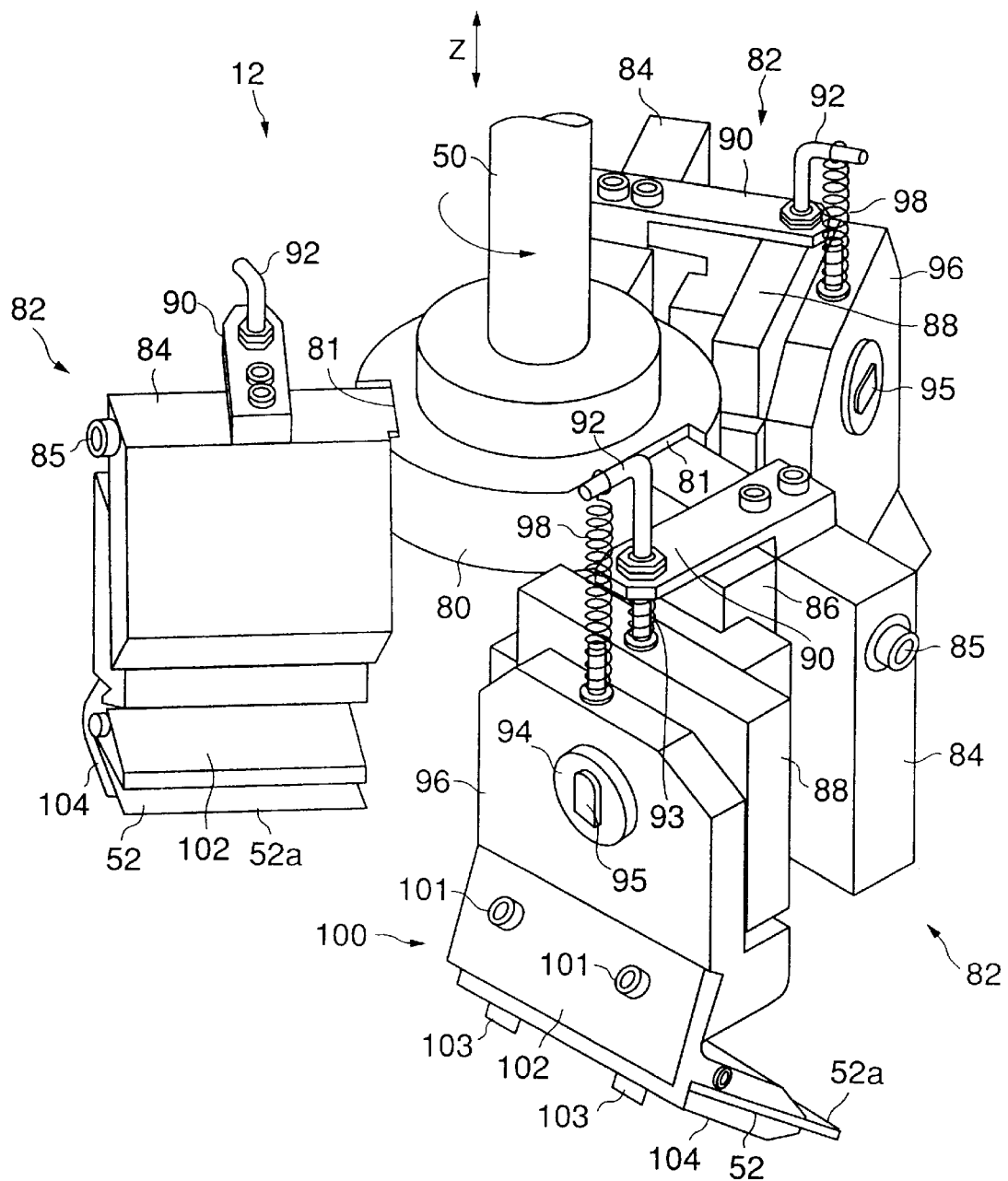
FIG. 5 is a perspective view of a squeegee unit in accordance with another embodiment of the present invention.
Figure 6:
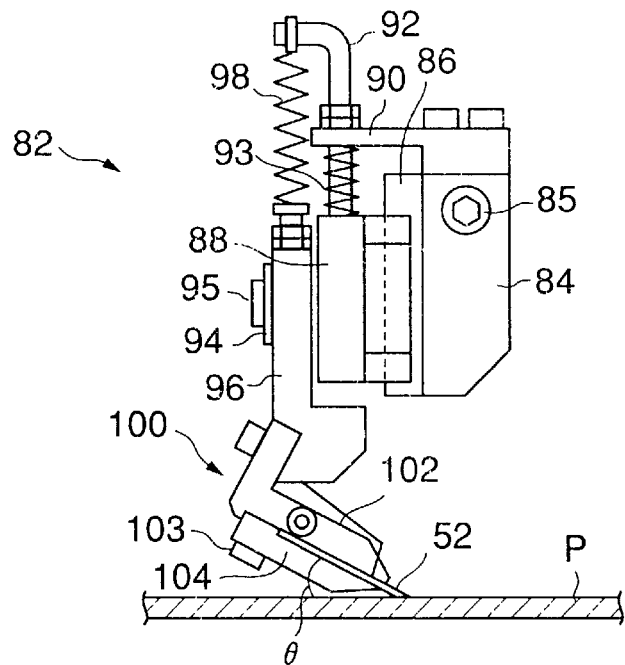
FIG. 6 is a squeegee assembly of the squeegee unit shown in FIG. 5.
Figure 7:
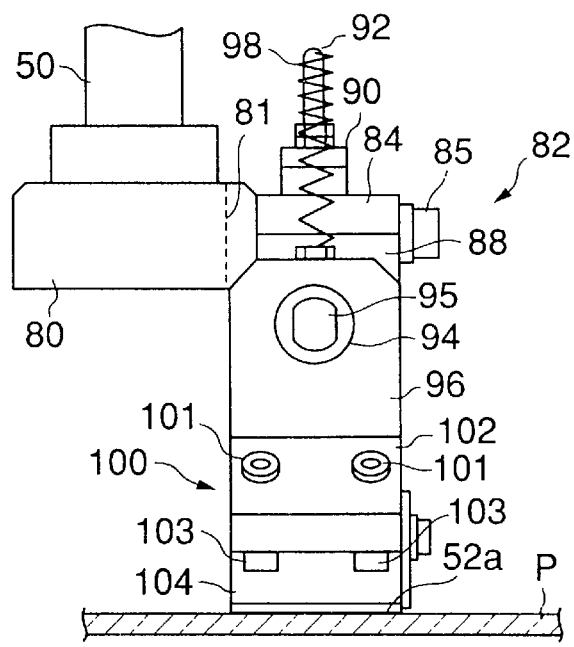
FIG. 7 is a plan view of the squeegee assembly shown in FIG. 6.

A squeegee unit 12 in accordance with another embodiment of the present invention will be explained hereinafter with reference to FIGS. 5 through 7. Since other components than the squeegee unit 12 are substantially the same as in the previous embodiment, their detailed explanation is omitted. The rotation axis 14a of motor 14 is connected to a driving axis 50. A supporting ring 80 is fixed to the lower end of driving axis 50. Along the outer surface of supporting ring 80 three engagement grooves 81 are provided in equal distance in its circumferential direction.

Grooves 81 are provided along the axial direction (the Z-direction) of driving axis 50, respectively. Each squeegee assembly 82 is engaged with each groove 81 and has a base plate 84 with a rectangular cross section. The base plate 84 is fixed to the supporting ring 80 with a screw 85 while the upper part of base plate 84 is engaged with the groove 81. The base plates 84 extend radially with respect to the driving axis 50 and below along the Z-direction from the supporting ring 80.

A guide rail 86 extending along the Z-direction is fixed to the base plate 84. A rectangular shaped lifting block 88 is supported movably along the Z-direction. A supporting arm 90 is fixed at the upper portion of the base plate 84 and extends over the lifting block 88. A guide shaft 92 is fixed at the edge of the supporting arm 90.

The guide shaft 92 extends from the supporting arm 90 upwardly and downwardly along the Z-axis direction. The lower end of the guide shaft 92 is inserted slidingly into a hole (not shown) made at the upper part of the lifting block 88. A compressed spring 93 is installed at the lower part of the guide shaft 92 between the lifting block 88 and the supporting arm 90. The lifting block 88 is biased downwardly by the spring 93.

A pivot 95 is provided at the lifting block 88 and projects therefrom in parallel with the surface of the glass substrate P. A rotary plate 96 is rotatably equipped with the pivot 95 through a bearing unit 94. A pulling spring 98 is provided between the upper portion of the rotary plate 96 and the upper end of the guide shaft 92 to hold elastically the rotary plate 96 in the neutral position. A rectangular shaped squeegee 52 is installed in a holder 100 at the lower portion of the rotary plate 96.

The holder 100 includes an L-shaped holder body 102 fixed at the lower end of the rotary plate 96 with a pair of screws 101, a cramp 104 fixed at the lower edge of the holder body 102 with a pair of screws 103. A squeegee 52 is equipped with the holder 100 in which it is held between the holder body 102 and the cramp 104. The inclination of the squeegee 52 with respect to the front surface of the glass substrate P, i.e., the angle θ shown in FIG. 6 is adjustably set to be 30 degrees, for instance, selected from 20 degrees through 50 degrees with the screw 103.

In accordance with the structure of the squeegee unit 12 mentioned above, the squeegee 52 of each squeegee assembly 82 is supported with the lifting block 88 movably along the Z-axis direction, i.e., the direction perpendicular to the glass substrate surface, and is also provided ratably about the pivot 95. The blade 52a of each squeegee 52, therefore, contacts on the surface of the glass substrate without any gap and is forced thereto with pressure of the coil spring 93. The squeegee unit 12 is rotated at the speed of about 100 r.p.m., for instance, and, at the same time, is moved along scanning paths on the surface of the glass substrate P so that the blade 52a of each squeegee 52 moves to eliminate foreign materials such as glass cullets, adhesives, sealant and the like therefrom. The squeegee unit 12 used in this particular embodiment also brings about substantially the same functions and results as in the previous embodiment.

The present invention is not limited to the embodiments but include a variety of modifications to which those skilled in the art can make. A scanning path of the squeegee unit, for instance, is not limited to the rectangular one but other paths may be set depending on the size of the glass substrate. The squeegee unit may have at least one squeegee to carry out substantially the same operation and functions as mentioned above. The number of squeegees is a matter of design choice. Squeegee materials, rotation speed, moving speed or the like may depend on engineering requirements.

It would be readily apparent to those skilled in the art to apply the present invention to other cleaning methods and apparatus than those of a glass substrate used for a liquid crystal display panel.

As apparent from the detail description of the invention, the scanning of a squeegee while it rotates results in easy and reliable method of cleaning a glass substrate to remove foreign materials therefrom.

What I claim is:

1. A method of cleaning a surface of a glass substrate comprising the steps of:

rotating a squeegee unit about a rotation axis, the rotation axis of said squeegee unit extending toward a direction perpendicular to a surface of said glass substrate; and driving said squeegee unit in a predetermined scanning direction on said glass substrate while said squeegee unit is being rotated to thereby remove foreign materials adhered to the surface of said glass substrate, said sgueegee unit being set at an angle of less than 50° with respect to a surface of the glass substrate.

2. The method of cleaning a glass substrate according to claim 1 wherein in said driving step said squeegee unit is driven in the predetermined scanning direction when said rotation axis is positioned on the surface of said glass substrate.

3. The method of cleaning a glass substrate according to claim 2 wherein said squeegee unit includes a blade and wherein in said driving step, said squeegee unit is driven in the predetermined scanning direction while a central portion of a longitudinal direction of said blade is positioned on the surface of said glass substrate.

4. The method of cleaning a glass substrate according to claim 2 wherein said squeegee unit includes a plurality of blades disposed radially from the rotation axis and wherein in said driving step, said squeegee unit is driven in the predetermined scanning direction on the surface of said glass substrate while said squeegee unit rotates.

5. The method of cleaning a glass substrate according to claim 1 wherein said squeegee unit includes a blade and wherein in said driving step, said squeegee unit is driven in the predetermined scanning direction while a central portion of a longitudinal direction of said blade is positioned on the surface of said glass substrate.

6. The method of cleaning a glass substrate according to claim 5 wherein said squeegee unit includes a plurality of blades disposed radially from the rotation axis and wherein in said driving step, said squeegee unit is driven in the predetermined scanning direction on the surface of said glass substrate while said squeegee unit rotates.

7. The method of cleaning a glass substrate according to claim 1 wherein said squeegee unit includes a plurality of blades disposed radially from the rotation axis and wherein in said driving step, said squeegee unit is driven in the predetermined scanning direction on the surface of said glass substrate while said squeegee unit rotates.

8. A method of cleaning a surface of a glass substrate comprising:

rotating a squeegee unit about a rotation axis, the rotation axis of said squeegee unit extending toward a direction perpendicular to a surface of said glass substrate; and driving said squeegee unit in a predetermined scanning direction on said glass substrate while said squeegee unit is being rotated to thereby remove foreign materials adhered to the surface of said glass substrate, said squeegee unit being set at an angle of 20° to 50° with respect to a surface of the glass substrate.

* * * * *